(12) United States Patent
Burghaus et al.

(10) Patent No.: US 6,605,342 B1
(45) Date of Patent: Aug. 12, 2003

(54) DIMENSIONALLY STABLE LABEL FOR A BOTTLE PROVIDING A NONSLIP GRIPPING SURFACE

(75) Inventors: Johannes Burghaus, Gross-Umstadt (DE); Gernot Mecks, Hoechst (DE); Martina Schmitt, Gernsheim (DE)

(73) Assignee: Wella AG, Darmstadt (DE)

( * ) Notice: Subject to any disclaimer, the term of this patent is extended or adjusted under 35 U.S.C. 154(b) by 0 days.

(21) Appl. No.: 09/509,866

(22) PCT Filed: Jul. 31, 1999

(86) PCT No.: PCT/EP99/05545
§ 371 (c)(1),
(2), (4) Date: Apr. 3, 2000

(87) PCT Pub. No.: WO00/07814
PCT Pub. Date: Feb. 17, 2000

(30) Foreign Application Priority Data

| Aug. 6, 1998 | (DE) | ......................................... | 198 35 477 |
| May 12, 1999 | (DE) | ......................................... | 199 21 717 |
| Jun. 9, 1999 | (DE) | ......................................... | 199 26 294 |
| Jun. 14, 1999 | (DE) | ......................................... | 199 26 939 |

(51) Int. Cl.[7] ............................................... B32B 7/02
(52) U.S. Cl. ...................... 428/214; 428/201; 428/203; 428/204; 428/206; 428/207; 428/213; 428/215; 428/216; 428/334; 428/354; 428/515; 428/516; 428/517; 428/519; 428/521
(58) Field of Search ................ 428/213, 214, 428/215, 216, 195, 201, 203, 204, 206, 207, 332, 334, 515, 516, 517, 519, 521, 343, 354

(56) References Cited

U.S. PATENT DOCUMENTS 3,955,020 A * 5/1976 Cavnagh et al. ............. 428/515
5,616,420 A * 4/1997 Yamaoka et al. ............ 428/515
6,286,872 B2   9/2001 Barre ............................ 283/81

FOREIGN PATENT DOCUMENTS

| EP | 0 542 553 A1 | 5/1993 |
| EP | 0 668 154 A1 | 8/1995 |
| EP | 0 932 136 A1 | 7/1999 |

OTHER PUBLICATIONS

Database WPI, Section CH, Week 199546, Derwent Publications Ltd, London, GB; AN 1995–354957 XP002121185 & JP 07 242236 A Sep. 19, 1995.
Database WPI, Section CH, Week 199026, Derwent Publications Ltd, London, GB, AN 1990–198347 XP JP 02 132487 A, May 21, 1990.
Product Information Sheet,508216, 49004, 508583,508586. (1999).
US Publishes Application 20010011822, Publication Date Aug. 9, 2001, Inventor: Barre, P.
US Publishes Application 20010002089, Publication Date May 31, 2001, Inv.: Barre, P.

* cited by examiner

Primary Examiner—D. S. Nakarani
(74) Attorney, Agent, or Firm—Michael J. Striker

(57) ABSTRACT

A label for a container has a transparent first foil (2) consisting of a transparent nonslip material (4), which can be a thermoplastic elastomer, a transparent second foil (3) consisting of a transparent material (5) with tensile strength, such as polypropylene, and an adhesive layer (9). The second foil (3) is arranged between the first foil (2) and the adhesive layer. The second foil (3) is provided with an imprint (17.3) on a side facing the adhesive layer (9) and the imprint (17.3) is embedded in the adhesive layer. In another embodiment the label includes a transparent foil (21), which is made of a transparent material (24) with tensile strength, a nonslip coating (22) on a first side (34). The coating (22) is preferably a lacquer coating (23). These labels provide a nonslip gripping surface on a container and are dimension stable, which facilities imprinting.

9 Claims, 2 Drawing Sheets

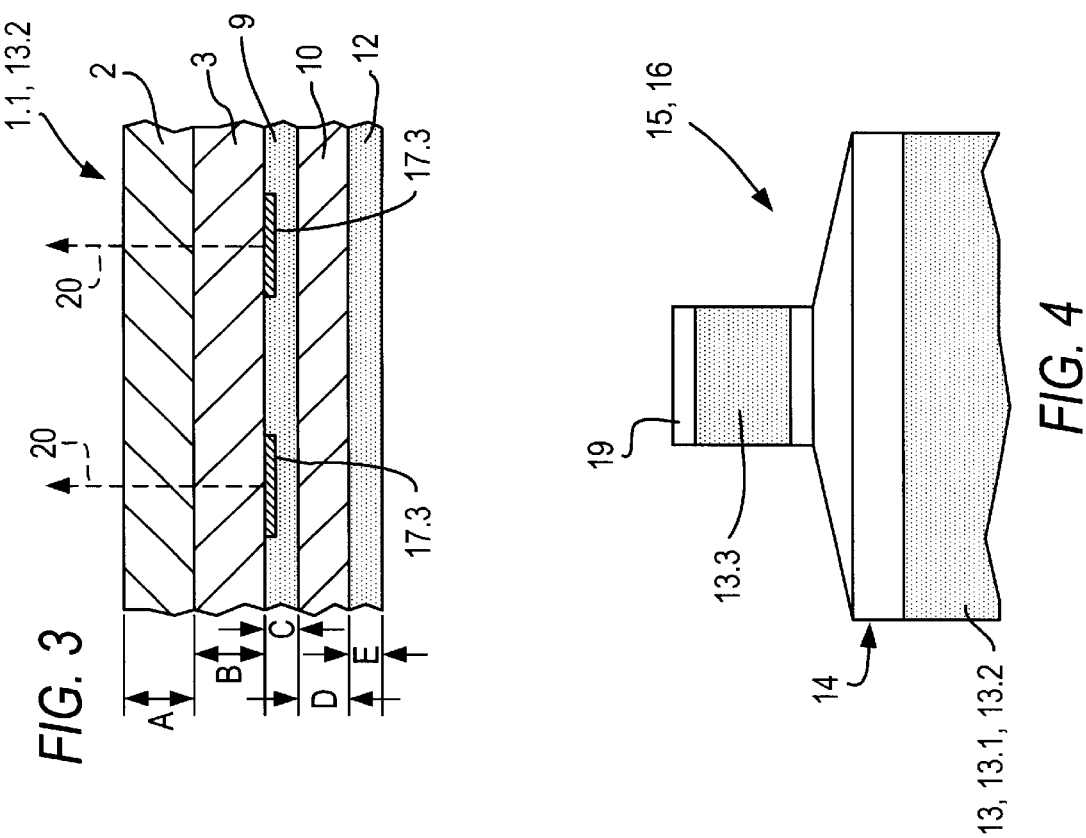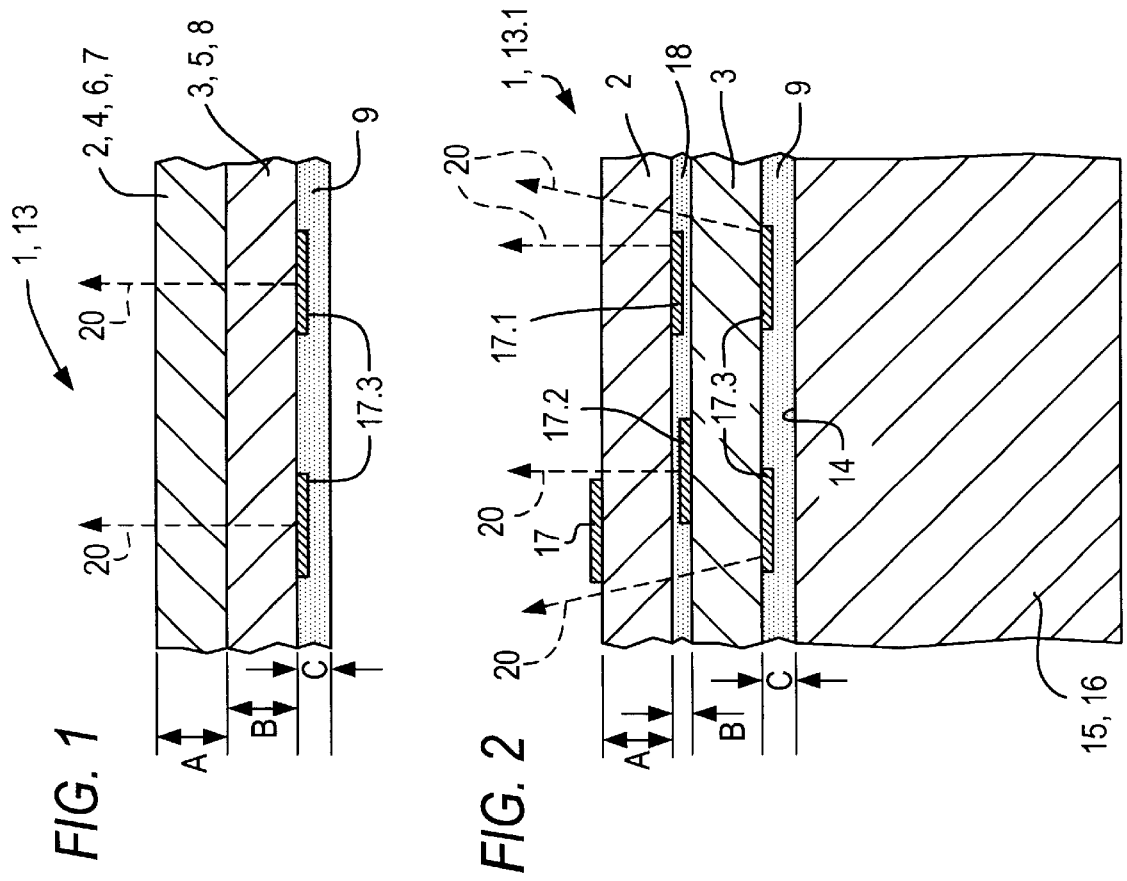

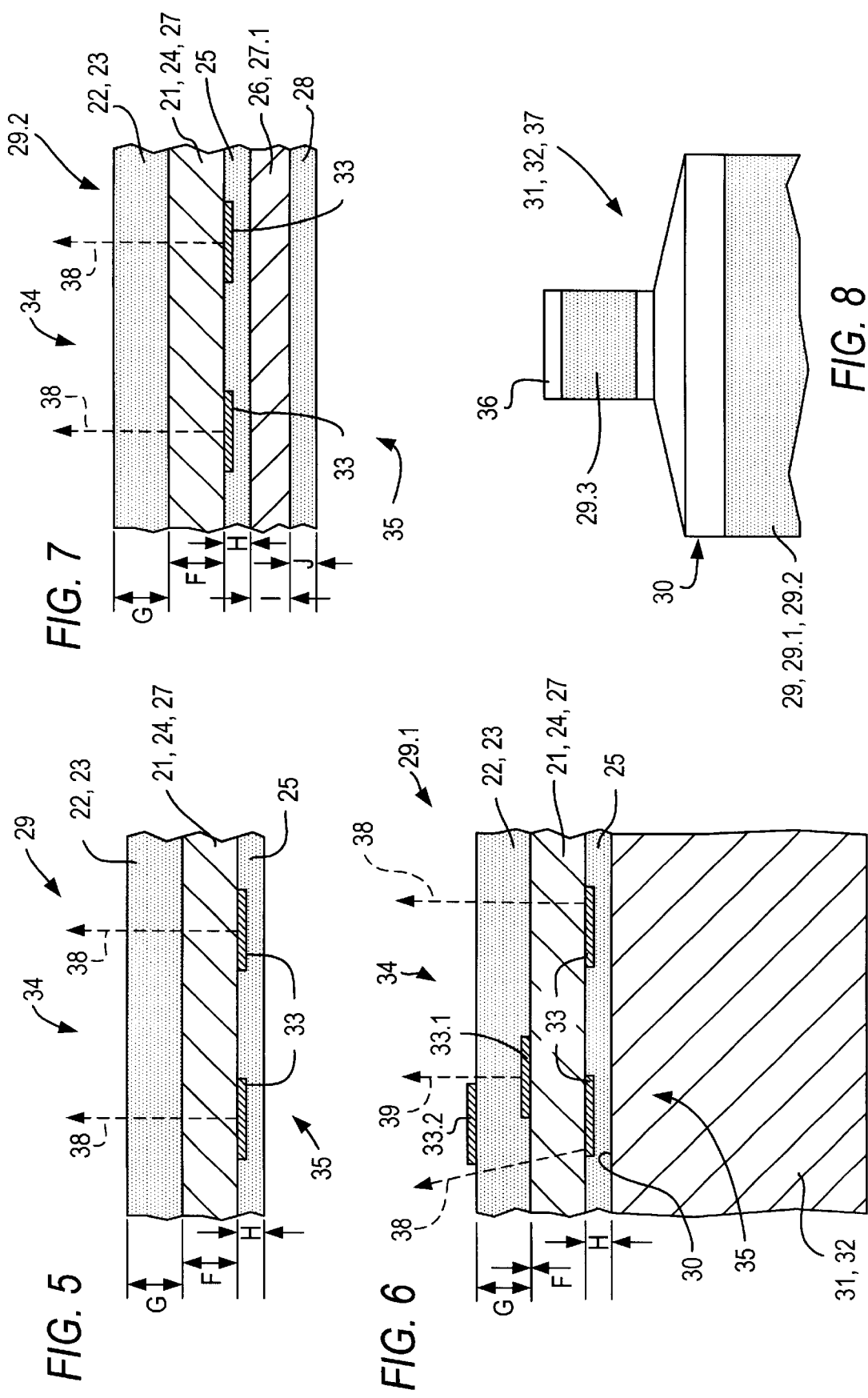

DIMENSIONALLY STABLE LABEL FOR A BOTTLE PROVIDING A NONSLIP GRIPPING SURFACE

BACKGROUND OF THE INVENTION

The present invention relates to a label for a bottle and, more particularly, to a label for a bottle that provides a nonslip gripping surface and has dimensional stability facilitating imprinting.

The invention relates to a foil as generically defined by the preamble to claim 1.

SUMMARY OF THE INVENTION

The object of the present invention is to provide a label for a bottle with a nonslip gripping surface that can be stretched only insignificantly, so that it can be used for the most various purposes by means of simple provisions, especially so that it can be easily imprinted.

According to the invention, this object and others which will be made more apparent hereinafter, are attained by a dimension stable label for a container, which comprises a transparent first foil consisting of a transparent nonslip material, a transparent second foil consisting of a transparent material providing tensile strength to the label and an adhesive layer. The transparent second foil is arranged between the transparent first foil and the adhesive layer. The transparent second foil is provided with an imprint on a side facing or closest to the adhesive layer, the imprint is embedded in the adhesive layer and the transparent first foil is joined with the transparent second foil.

In another embodiment of the dimension stable label the label comprises a transparent foil made of a transparent material that provides tensile strength and an adhesive layer. The transparent foil has an imprint on a side facing or closest to the adhesive layer and a transparent nonslip coating on an opposite side from the adhesive layer. The nonslip coating is provided by a lacquer coating.

BRIEF DESCRIPTION OF THE DRAWING

The objects, features and advantages of the invention will now be illustrated in more detail and the aid of the following description of the preferred embodiments, with reference to the accompanying figures in which:

FIG. 1 is a detailed sectional view of a first exemplary embodiment of a label according to the invention;

FIG. 2 is a detailed sectional view of a second exemplary embodiment;

FIG. 3 is a detailed sectional view of a third exemplary embodiment;

FIG. 4 is a side view of a bottle with a screw cap, which is provided with the first through third exemplary embodiments of the corresponding labels;

FIG. 5 is a detailed sectional view of a fourth exemplary embodiment of a label according to the invention;

FIG. 6 is a detailed sectional view of a fifth exemplary embodiment of a label according to the invention, which is joined to an outer wall of a container;

FIG. 7 is a sectional view of a sixth exemplary embodiment of a label according to the invention; and FIG. 8 is, in a side view, a bottle with a cap having a label according to the invention.

DESCRIPTION OF THE PREFERRED EMBODIMENTS

In FIG. 1, a composite foil 1 is shown which comprises a first foil 2 and a further, second foil 3; the two foils 2,3 are joined together (for instance by a thin adhesive layer 18 in FIG. 2 or by a coextrusion process in FIG. 1). The first foil 2 comprises a nonslip material 4 and has a foil thickness A of a maximum of 100 $\mu$m. The second foil 3 comprises a material 5 with tensile strength and has a foil thickness B of a maximum of 100 $\mu$m. As a nonslip material 5, a rubberlike material 6 is provided, such as a thermoplastic elastomer 7. The second foil 3 advantageously comprises polypropylene (PP) 8. The second foil 3 is provided on its outside with an adhesive layer 9, and as a result the composite foil 1 can be joined to objects (for instance as a nonslip surface on a floor or a wall or consumer products). The first foil 2 can optionally be provided with an imprint 17, 17.1 on the outside and/or inside; if there is an imprint 17.1 on the inside, the first foil 2 must be transparent. It is also possible, however, for the second foil 3 only, or additionally, to be optionally provided with an imprint 17.2, 17.3 on the outer layer and/or on the side remote from the first foil 2. In the first instance, only the first foil 2 has to be transparent; in the second instance, the second foil 3 must be transparent as well, so that the imprint 17.3 is visible from outside (arrow 20). In this second instance, there is also greater contrast of the imprint 17.3, since it is embedded in the adhesive layer 9. The first foil 2 preferably has a thickness A of approximately 40 $\mu$m, and the second foil 3 preferably has a thickness B of approximately 40 $\mu$m. The adhesive layer 9 preferably has a thickness C of approximately 20 $\mu$m. The first foil 2 can be provided as needed with a selective Shore hardness. As the preferred material for the first foil 2, a mixture of rubber and thermoplastic, or a plastic mixture with a polyethylene component, or a plastic mixture with a polypropylene component, or a polypropylene-EPDM mixture can be provided. The second foil 3 has, along with the tensile strength of the composite foil 1, the further substantial advantage that as a result the composite foil 1 can be imprinted in a technologically simpler (and less expensive) way, since it cannot warp shape-elastically. An imprint 17.3 on the second foil 3 has the substantial advantage not only of simple imprinting but also that the imprint 17.3, for instance in the form of a label 13 on a bottle 16 (FIG. 2), is protected on the outside. All printing techniques, such as screen printing, rotogravure, offset printing and letterpress printing, are possible.

In FIG. 2, the composite foil 1 is embodied as a label 13 and is joined to an outer wall 14 of a container 15. If the outer wall 14 of a bottle 16 is shape-elastic, then the label 13 (preferably with a total thickness of approximately 100 $\mu$m) is also embodied in such a way that it can bend correspondingly shape-elastically, for instance to allow the removal of a metered amount of liquid from the bottle 16, without causing the label 13 to wrinkle. A particular advantage in terms of manipulation is obtained taking a shampoo bottle 16 as an example, and in particular for any bottle 16, wetted with wash water, that the bottle 16 is provided with one label 13, 13 each on the front and the back sides.

FIG. 3 shows a composite foil 1.1 with an (additional) third foil 10 (thickness D approximately 30 $\mu$m) and a further adhesive layer 12 (layer thickness E approximately 20 $\mu$m), so that for further processing the imprint 17.3 (layer thickness approximately 6–8 $\mu$m) is already protected immediately after being imprinted.

FIG. 4 shows an upper part of a bottle 16 with a screw cap 19. A label 13, 13.1, 13.2 can optionally be joined to the outer wall 30 of the bottle 12; the label 13, 13.1, 13.2 can also extend all the way around the bottle 12. To make it easier to screw on, the screw cap 16 is provided on the outside with a cap label 13.3 extending all the way around, which can have the same nature as the labels 13, 13.1, 13.2, optionally with or without an imprint 17, 17.1, 17.2, 17.3.

In FIG. 5, a foil 21 with a nonslip surface is shown that comprises a material 24 with tensile strength and has a thickness F of a maximum of 100 μm. On a first side 34, a nonslip rubberlike coating 22 with a thickness G of a maximum of 100 μm is provided. As the coating 22, a transparent lacquer coating 23 (optionally colorless or colored) is provided, which is preferably created by spraying or rolling on of a suitable lacquer (such as matte coating lacquer with a velvet-soft surface made by Schekolin A G, Liechtenstein, catalog number 508583 and 508586, or elastic coating lacquer with a rubberlike, silky-soft surface with a good grip made by Schekolin A G, Liechtenstein, catalog number 508216).

Particularly by spraying, a very thin thickness G of the lacquer coating 23 can be achieved. As a result of the transparent lacquer coating 23, an imprint 33.1 (FIG. 6) on the first side 34 of the foil 21, which can be nontransparent, is visible from the first side 34 (arrow 39). By means of a transparent foil 21, an imprint 33 (FIGS. 5–7) on the second side 34 of the foil 21 can be seen from the first side 34 (arrow 38). In the case of an external imprint 33.2 (FIG. 6) on the first side 34, the coating 22 and the foil can be nontransparent. The foil 21 advantageously comprises polypropylene (PP) 27 and is provided on a second side 35 with an adhesive layer 5, allowing it to be joined to objects (for instance as a nonslip surface on a floor or on a consumer product). The foil 21 or the coating 22, 23 can optionally be provided with an imprint 33, 33.1, 33.2 (FIGS. 5–7) on a first and/or second side 34, 35 and can also be used as a label 29. Preferably, the foil 21 has a layer thickness F of approximately 40 μm, and the coating 22 has a layer thickness G of 40 μm, so that the intrinsic weight is very low and the flexibility is high. The adhesive layer 25 preferably has a layer thickness H of approximately 20 μm.

In FIG. 6, the foil 21 is embodied as a label 29.1 and is joined to an outer wall 30 of a container 31. The label 29.1 is embodied such that if the outer wall 30 of a bottle 32 is shape-elastic, it can bend shape-elastically as well, for instance to allow the removal of a metered amount of liquid from the bottle 32 by manual pressure, without making the label 29 wrinkle. Taking a shampoo bottle 37 as an example, and in particular any bottle 32 wetted with wash water, a special advantage with regard to handling (a firm grip) is obtained by providing the bottle 32 with one label 29.1, 29.1 each on the front and back sides.

In FIG. 7, the foil 21 is additionally provided with a second foil 26 (layer thickness I approximately 30 μm) of a modified polypropylene (OPP) 27.1 and a further adhesive layer 28 (layer thickness J approximately 20 μm). As a result, immediately after it has been printed, the imprint 33 (layer thickness approximately 6–8 μm) is already protected for the sake of further processing by the second foil 26, which is joined to the adhesive layer after the printing and after the adhesive layer 5 has been applied, and the imprint can then be used as a label 29.2.

In FIG. 8, an upper part of a bottle 32 with a screw cap 36 is shown. A label 29, 29.1, 29.2 can optionally be joined to the outer wall 30 of the bottle 32, and the label 29, 29.1, 29.2 can also extend all the way around the bottle 32. To make it easier to screw on, the screw cap 36 is provided on its outside with a cap label 29.3 extending all the way around, which can have the same nature as the labels 29, 29.1, 29.2, optionally with or without an imprint 33, 33.1, 33.2.

In summary, the following advantages are obtained with the inventions:

Warp-proof foil despite a nonslip surface.

Objects such as bottles can be made slip-proof and secure to handle (with a good grip) merely by means of suitable labeling.

Unproblematic imprinting of the foil as a label, since the foil can be stretched only insignificantly (dimensional stability).

Screwing a screw cap on is made easier by a cap label.

Lessening of a feeling of cold with cold objects.

Lessening of a feeling of heat with hot objects.

Pleasing soft feel to the grip.

Increase in the subjective quality of an object.

Usable in manifold ways as an anti-slip foil because of a very thin foil (approximately 100 μm).

What is claimed is:

1. A label for a container, said label consisting of:
   a first foil consisting of a transparent nonslip material, said first foil having a maximum thickness of 100 μm,
   a second foil consisting of a transparent material selected to provide tensile strength to the label, said second foil having a maximum thickness of 100 μm;
   an adhesive layer for bonding the label to the container, said adhesive label being arranged on a side of said second foil opposite to said first foil; and
   an imprint embedded in said adhesive layer so as to be visible through said first foil and said second foil;
   wherein said first foil and said second foil are bonded to each other in a common extrusion process for making said first foil and said second foil;
   whereby said label has dimension stability and provides a nonslip gripping surface for the container.

2. The label as defined in claim 1, wherein said first foil consists of a thermoplastic elastomer.

3. The label as defined in claim 1, wherein said second foil consists of polypropylene.

4. The label as defined in claim 1, wherein said adhesive layer has a thickness of about 20 μm.

5. The label as defined in claim 1, wherein said first foil consists of rubber or a mixture of polypropylene and EPDM.

6. A label for a container, said label consisting of:
   a foil consisting of a transparent material selected to provide the label with tensile strength and having a maximum thickness of 100 μm;
   an adhesive layer for bonding the label to the container, said adhesive label being arranged on one side of the foil;
   a nonslip coating on another side of the foil opposite from the one side having the adhesive layer, said nonslip coating consisting of a transparent lacquer coating having a maximum thickness of 100 μm; and
   an imprint embedded in said adhesive layer so as to be visible through said foil and said nonslip coating;
   whereby said label has dimension stability and provides a nonslip gripping surface for the container.

7. The label as defined in claim 6, wherein the foil consists of polypropylene.

8. The label as defined in claim 6, wherein the foil has a thickness of about 40 100 μm.

9. The label as defined in claim 6, wherein the adhesive layer has a thickness of about 20 μm.

* * * * *